United States Patent [19]

Worner

[11] 3,986,239

[45] Oct. 19, 1976

[54] METHOD FOR SOLDERING THE BLADES OF A ROTOR FOR HYDRODYNAMIC TORQUE CONVERTERS

[75] Inventor: Otto Wörner, Reutlingen, Germany

[73] Assignee: Daimler-Benz Aktiengesellschaft, Germany

[22] Filed: Jan. 18, 1974

[21] Appl. No.: 434,634

[30] Foreign Application Priority Data

Jan. 18, 1973 Germany............................ 2302268

[52] U.S. Cl...................... 29/156.8 CF; 29/156.8 R; 228/246; 228/255

[51] Int. Cl.²...................... B21K 3/04; B23P 15/02; B23P 15/04

[58] Field of Search............... 29/500, 494, 156.8 R, 29/156.8 CF; 228/246, 250, 255

[56] References Cited

UNITED STATES PATENTS

| | | | |
|---|---|---|---|
| 1,597,488 | 8/1926 | Steenstrup | 29/494 |
| 3,316,622 | 5/1967 | Jandasek | 29/156.8 FC |
| 3,708,846 | 1/1973 | Worner | 29/156.8 CF |

FOREIGN PATENTS OR APPLICATIONS

| | | | |
|---|---|---|---|
| 18,349 | 6/1911 | United Kingdom | 29/156.8 CF |

*Primary Examiner*—Francis S. Husar
*Assistant Examiner*—Carl Rowold
*Attorney, Agent, or Firm*—Craig & Antonelli

[57] ABSTRACT

A method for fastening by brazing (hard-soldering) the blades of a rotor for a hydrodynamic torque converter or the like, in which the blades are fastened with respect to an inner shell by means of lugs which are extended through corresponding slots in the inner shell and are thereafter bent over; in the assembly, the blades are fixed in the given position in an outer shell by one circumferential clamping band each whereafter the inner shell is assembled by extending the lugs through the slots thereof and the lugs are thereafter bent over; a wire ring of soldering or brazing material is then applied at least within the joint area of the outer clamping band with the outer shell and the assembly is then heated, preferably in a protective gas atmosphere to a temperature above the melting temperature of the soldering or brazing material; after the soldering or brazing material has run into the gaps and cracks the assembly is then cooled.

4 Claims, 1 Drawing Figure

18 13 15 20 17 16 19 14 12 11 10

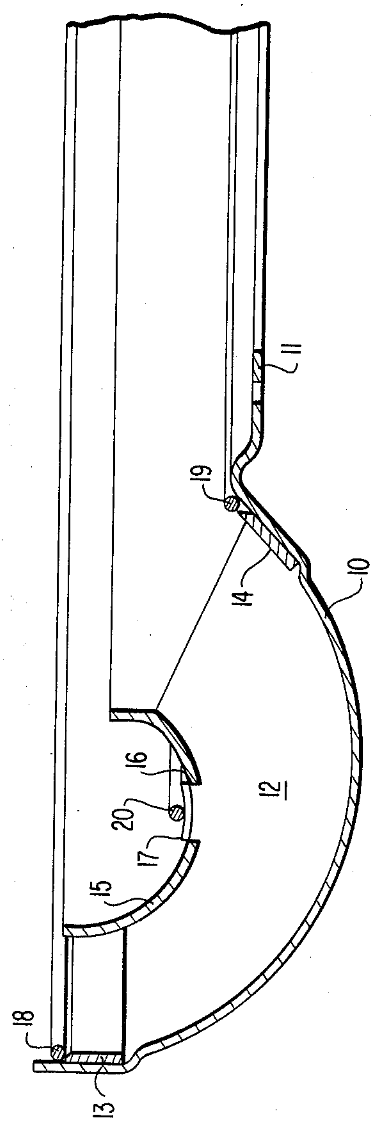
11
19
14
10
16
20
12
17
15
18
13

METHOD FOR SOLDERING THE BLADES OF A ROTOR FOR HYDRODYNAMIC TORQUE CONVERTERS

The present invention relates to a method for fastening by soldering the blades of a rotor for hydrodynamic torque converters, and more particularly to a method for fastening the blades of a rotor for hydrodynamic torque converters by brazing (hard soldering), in which the blades are fastened with respect to an inner shell by lugs which are extended through corresponding slots provided in the inner shell and are then bent over.

Rotors are known in the prior art for hydrodynamic torque converters whose blades are secured at the inner and outer shell by means of lugs. For the most part, the fastening of the blades thereby takes place by a corresponding prestress thereof so that they cannot become disengaged. It is additionally known in the prior art in connection with rotors for hydrodynamic units to insert the blades manually and to insert small rods of brazing material manually into the chambers formed thereby. This method is relatively time-consuming and additionally entails the disadvantage that the hard-soldering or brazing material is distributed non-uniformly under certain circumstances which not only may have as a consequence a poor brazing joint but above all imbalances during the operation.

The present invention is concerned with the task to provide a method by means of which the described disadvantages can be avoided. Consequently, as uniform as possible a distribution of the hard-solder or brazing material and additionally as simple as possible a manufacture is to be attained by the present invention.

The underlying problems are solved with the hydrodynamic torque converters of the aforementioned type in that the blades are fixed in the given position in the outer shell by one circumferential clamping band each, in that the inner shell is then installed while the lugs are extended through the slots thereof and the lugs are then bent over, in that at least within the joint area of the outer clamping band with the outer shell, a wire ring of hard-solder or brazing material is applied and subsequently the rotor together with the wire rings is heated, preferably in a protective gas atmosphere, to a temperature lying above the melting temperature of the hard-solder or brazing material and is cooled off after the running of the hard-solder or brazing material.

Work-time is economized by the method in accordance with the present invention and above all, the hard-solder or brazing material is distributed uniformly over the circumference so that no imbalances can occur. The brazing material distributes itself quite uniformly during the melting—also if the wire ring is not disposed exactly at the location of the joint or contact but slightly adjacent thereto—and thereby flows into the interstices and cracks between the blades and the outer shell. The fact is thereby used to advantage that the hard-solder or brazing material, at least to some extent, creeps along from the bottom toward the top in these cracks as a result of the capillary action. Of course, a wire ring may also be applied according to the present invention additionally within the joint area of the inner clamping band and/or—in case also the brazing of the inner shell is desirable—within the area of the lugs extended through the slots.

Accordingly, it is an object of the present invention to provide a method for fixing the blades of a rotor for hydrodynamic torque converters by the use of brazing techniques which avoids by simple means the aforementioned shortcomings and drawbacks encountered in the prior art.

Another object of the present invention resides in a method for brazing in the blades of a rotor for hydrodynamic torque converters which considerably reduces the time required for carrying out the method and avoids non-uniform distribution of the brazing material, thereby avoiding imbalances during operation.

A further object of the present invention resides in a method of the type described above which is relatively simple, requires relatively little time and assures a completely satisfactory assembled unit.

These and further objects, features, and advantages of the present invention will become more apparent from the following description when taken in connection with the accompanying drawing which shows, for purposes of illustration only, one embodiment in accordance with the present invention, and wherein:

The single FIGURE is a cross-sectional view through the turbine wheel of a hydrodynamic torque converter provided with wire rings of brazing material prepared for the manufacture according to the present invention.

Referring now to the single figure of the drawing, the turbine wheel consists of an outer shell 10 which is fastened with an inner annular portion 11 at a flange or a hub (not shown) of the corresponding transmission drive shaft. The blades 12 are inserted into this outer shell 10 which are retained in their predetermined position at the outer and at the inner circumference by clamping bands 13 and 14. These clamping bands 13 and 14 are slotted comb-like and the blades 12 are slightly undercut at these places so that they can be inserted into the slots of the two clamping bands 13 and 14. The inner ring 15 which is provided with slots 16 is thereby placed over the blades 12 inwardly thereof. Corresponding lugs 17 provided at the blades 12 are extended through these slots 16 and are bent off after being extended through these slots. These clamping bands 13 and 14 firmly contact the blades or shell with a slight elastic pre-stress so that the blades do not slide off during assembly.

Prior to the removal into the furnace, wire rings 18 and 19 of conventional brazing material (conventional hard-solder) are emplaced at the contact or joint places of the two clamping bands 13 and 14 along the outer and inner circumference. A third wire ring 20 is placed into the inner shell 15 in such a manner that it comes to rest on the lugs 17. Thereafter the entire rotor is inserted into the furnace and is heated under a protective gas to a temperature lying above the melting point of the brazing material. The brazing material thereby melts and now runs into the slots between the clamping bands 13 and 14 and the blades 12 as well as also along the outer shell 10. Also the inner wire ring 20 melts and its material runs into the slots between the lugs 17 and the slots 16 in the inner shell 15. With a sufficient brazing material, according to preferred methods of the present invention, the brazing material may under certain circumstances even run up slightly along the slots of the inner blade edge and of the inner shell 15. Subsequently, the rotors are then again taken out of the furnaces and are cooled.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A method of fastening the blades of a rotor for a hydrodynamic unit by brazing, in which the blades are secured with respect to an inner shell by lugs that are extended through corresponding slots disposed through only a central portion of the inner shell and are then bent over, comprising the steps of fixing the blades in the given position in an outer shell by at least one circumferential clamping band, thereafter emplacing the inner shell while extending the lugs in a single row through the centrally disposed slots provided in the inner shell and thereafter bending over the lugs, emplacing subsequently a first wire ring of brazing material at least within the joint area of an outer clamping band with the outer shell and emplacing a second wire ring of brazing material within the area of the lugs extending through said centrally disposed slots in said inner shell, and thereupon heating the rotor together with the first and second wire rings to a temperature above the melting point of the brazing material, and finally cooling the assembly after the brazing material has run subsequent to being melted.

2. A method according to claim 1, characterized in that the rotor together with the wire rings is heated to said temperature in a protective gas atmosphere.

3. A method according to claim 1, characterized in that additionally a third wire ring is emplaced within the joint area of an inner clamping band with the outer shell.

4. A method according to claim 3 characterized in that the rotor together with the wire rings is heated to said temperature in a protective gas atmosphere.

* * * * *